No. 774,500. Patented November 8, 1904.

UNITED STATES PATENT OFFICE.

ALEXANDER H. STILLWAGON, OF CONNELLSVILLE, PENNSYLVANIA.

COMPOSITION COATING.

SPECIFICATION forming part of Letters Patent No. 774,500, dated November 8, 1904.

Application filed September 3, 1904. Serial No. 223,179. (No specimens.)

*To all whom it may concern:*

Be it known that I, ALEXANDER H. STILLWAGON, a citizen of the United States of America, residing at Connellsville, in the county of Fayette and State of Pennsylvania, have invented certain new and useful Improvements in Composition Coatings, of which the following is a specification.

This invention has relation to certain new and useful improvements in composition coatings, and relates more particularly to coatings that are employed to preserve iron and metal pipes from corrosion.

The present invention has for its object to provide a cheap composition that will greatly lengthen the lifetime of pipes and other metals that are subjected to sulfur, acids, water, and the like.

A still further object of my present invention is to provide a coating of the above-described character that will effectually close up the pores of the iron or other metal in such an effectual manner that the body of the metal will not be affected by the elements.

My invention further aims to provide an inexpensive coating that may be easily applied to roofs, steel constructions of all kinds, bridges, and other structures wherein iron and steel are employed.

With the above and other objects in view the invention consists in a composition which is composed of certain chemical ingredients, to be hereinafter more particularly described, and specifically pointed out in the claims.

My new and novel composition coating consists of the following ingredients and in the following proportions: tallow, two pounds; rosin, one-quarter pound; boiled linseed-oil, one-half pint; alum, one-quarter pound; copal, one pound; turpentine, one-half pint.

The manner of mixing my improved composition coating is as follows: The tallow is first rendered and the oil extracted therefrom. The rosin is then added in a powdered form and the linseed-oil boiled and added thereto. The powdered alum is then placed in the composition and stirred and the copal then poured into the mixture cold. The turpentine is then added to the compound and thoroughly mixed, and the mixture is then ready for use and can be used either hot or cold. The composition coating is then applied by means of a brush, or it may be dipped, one or more coats being applied to thoroughly coat the iron or other metal. After the coating has been applied the same will become hard and dry within twelve to twenty-four hours.

I have found by actual experiments that by the application of my improved composition coating metal will be rendered absolutely corrosive-proof and that my invention is particularly of great value in coating pipes in coal-mines where sulfur and other chemicals corrode all the pipes within a very short period of time.

It will be noted that I do not wish to limit myself to the precise quantity of the different ingredients that I employ, for the reason that the same may be changed without departing from the general spirit of my invention. For example, by adding more tallow, turpentine, and linseed-oil the composition will be lighter, and by increasing the rosin, alum, and copal the composition will be heavier, and, furthermore, the more turpentine that is used in my composition the less time it requires for the composition to dry or set.

Having fully described my invention, what I claim as new, and desire to secure by Letters Patent, is—

1. A composition coating consisting of tallow, rosin, linseed-oil, alum, copal and turpentine.

2. In a composition, the combination of the ingredients of tallow, rosin, boiled linseed-oil, alum, copal and turpentine.

3. The herein-described weatherproofing compound composed of tallow two pounds, rosin, one-quarter pound, boiled linseed-oil one-half pint, alum one-quarter pound, copal one pound and turpentine one-half pint, substantially as described.

4. A composition coating containing tallow, rosin, alum, copal and turpentine, substantially as described.

5. A composition coating containing boiled linseed-oil, rosin, alum, copal, and turpentine, substantially as described.

In testimony whereof I affix my signature in the presence of two witnesses.

ALEXANDER H. STILLWAGON.

Witnesses:
H. C. EVERT,
M. E. LAWSON.